(12) United States Patent
Anati et al.

(10) Patent No.: US 8,442,307 B1
(45) Date of Patent: May 14, 2013

(54) APPEARANCE AUGMENTED 3-D POINT CLOUDS FOR TRAJECTORY AND CAMERA LOCALIZATION

(75) Inventors: Roy Anati, Philadelphia, PA (US); Dragomir D. Anguelov, San Francisco, CA (US); David Martin, San Francisco, CA (US)

(73) Assignee: Google Inc., Mountain View, CA (US)

( * ) Notice: Subject to any disclaimer, the term of this patent is extended or adjusted under 35 U.S.C. 154(b) by 97 days.

(21) Appl. No.: 13/100,699

(22) Filed: May 4, 2011

(51) Int. Cl.
*G06K 9/00* (2006.01)

(52) U.S. Cl.
USPC .......................................... 382/154

(58) Field of Classification Search ............. 382/100, 382/103, 154, 203, 190, 305
See application file for complete search history.

(56) References Cited

U.S. PATENT DOCUMENTS 8,259,994 B1 * 9/2012 Anguelov et al. ............. 382/100

* cited by examiner

*Primary Examiner* — Duy M Dang (74) *Attorney, Agent, or Firm* — Sterne, Kessler, Goldstein & Fox P.L.L.C.

(57) ABSTRACT

A method and system are provided for image matching using an appearance augmented 3-D point cloud that includes receiving a first and second posed image, extracting image features from the first and second posed image, and comparing the extracted image features from the first posed image with the extracted image features from the second posed image. Next, a comparison is done to identify one or more matched features of the first and second posed images based on a feature appearance, where a grouping of the matched features of the first and second posed images is performed where the grouped matched features are associated with a first three-dimensional point. A position of the first three-dimensional point is identified based on a positional triangulation of the grouped matched features associated with the first three-dimensional point, and the first three-dimensional point is then augmented with the grouped matched features.

26 Claims, 7 Drawing Sheets

APPEARANCE AUGMENTED 3-D POINT CLOUDS FOR TRAJECTORY AND CAMERA LOCALIZATION

BACKGROUND

1. Field

Embodiments relate to video processing in mapping, machine vision, computer applications, and the World Wide Web.

2. Background

Accurate geographic position information is essential for a number of applications, including the building of maps, geo tagging data, and localizing images. An essential component of any such system is the ability to correctly identify the position of an object of interest where that position is estimated either by multiple sources or by a single source at different times. By identifying the position of multiple objects in relationship to a moving platform, a trajectory path of the moving platform can be established.

However, if trajectory paths are estimated either by multiple sources or by a single source at different times, the multiple trajectories must be aligned to be combined. Once multiple trajectories are combined into a single coherent whole, subsequent applications use of the trajectory data is greatly simplified.

Approaches for matching an image to an image set to align multiple trajectories typically focus on extracting scale-invariant feature descriptors from the image collection and constructing a fast query index over the descriptors. The problem of matching an image to an image set typically includes extracting the features from the query image and performing a look-up in the index for the image with the most similar and geometrically consistent set of feature matches. However, the problem of finding a consistent pose for moving (camera) platforms at trajectory intersections makes this matching difficult due to loop-closing.

BRIEF SUMMARY

Methods and systems for addressing the problems of finding a consistent pose for moving platforms at trajectory intersections and matching an image to an image set are provided.

In an embodiment, a computer-implemented image matching method includes receiving a first posed image and a second posed image. The method continues by extracting one or more image features from the first posed image and the second posed image, where the one or more extracted image features from the first posed image are compared with the one or more extracted image features from the second posed image to identify one or more matched features of the first and second posed images based on the appearance of features in the images. The method continues by grouping one or more of the matched features of the first and second posed images, wherein the grouped matched features of the first and second posed images are associated with a first three-dimensional point. The method identifies a position of the first three-dimensional point based on a positional triangulation of the grouped matched features associated with the first three-dimensional point. The method concludes by augmenting the first three-dimensional point with the grouped matched features associated with the first three-dimensional point.

In an embodiment, a system for three-dimensional image matching point cloud generation is provided. The system includes a computer-based image extraction system to extract one or more image features from a first posed image and a second posed image. The system includes an appearance feature comparison system that can compare the one or more extracted image features from the first posed image with the one or more extracted image features from the second posed image to identify one or more matched features of the first and second posed images based on feature appearance. The system also includes a track generation system to group one or more of the matched features of the first and second posed images into a first track, wherein the grouped matched features in the first track are associated with a first three-dimensional point. A three-dimensional triangulation system is used to identify a position of the first three-dimensional point based on a positional triangulation of the grouped matched features in the first track and an augmentation system to augment the first three-dimensional point with the grouped matched features in the first track.

Further embodiments and features, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments of the invention will now be described, by way of example only, with reference to the accompanying drawings in which corresponding reference symbols indicate corresponding parts. Further, the accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

While embodiments described herein are illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

Accurate position information for an image gathering mobile platforms is essential for many applications, including the building of maps, geo tagging data, and localizing images. An essential component of the embodiments disclosed herein is the ability to correctly align multiple trajectories collected at different times, dates, or by different platforms. Correctly aligning multiple trajectories makes it possible to combine the information from multiple trajectories into a coherent whole, which vastly simplifies its subsequent use in applications.

Embodiments disclosed herein recite a method of augmenting matched image data with three-dimensional (3-D) position data. In an exemplary embodiment, an image feature index is constructed over a first image collection. A second image collection is queried against the first image collection to determine which sets of images are most closely matched. For example, the most closely matched images at an intersection from the first and second image collections can be determined. This set of closely matched images allows an epipolar constraint to be computed for a given intersection of the images. Information can be extracted from multiple images to determine various trajectories, simultaneously, for validating the computed constraint. This additional information is associated with each image in the index to allow a full three-dimensional (3-D) alignment transform for the intersection.

Embodiments disclosed below describe a system that aligns the correct 3-D rigid transformation between two posed image sets and/or between a posed image set and a query image. A posed image set is a set of images or panoramas, for which its 3-D pose has been computed using structure-from-motion methods, and/or additional sensors such as GPS, inertial measurement sensors (INS), wheel odometry, or lasers. The matching framework allow a sparse 3-D point cloud to be created and augmented with visual information from local image features. The 3-D point cloud representation allows candidate 3-D transformations to be discovered and confirmed using both the geometric information and image appearance information stored in each augmented 3-D point.

The 3-D alignment process discussed above may also be used to align a separate single image to an existing posed set of images. This image-matching is useful for a variety of tasks, including enabling augmented reality applications, discovering the accurate position of mobile phones, and cross-referencing images from different image corpora.

Figure 1:
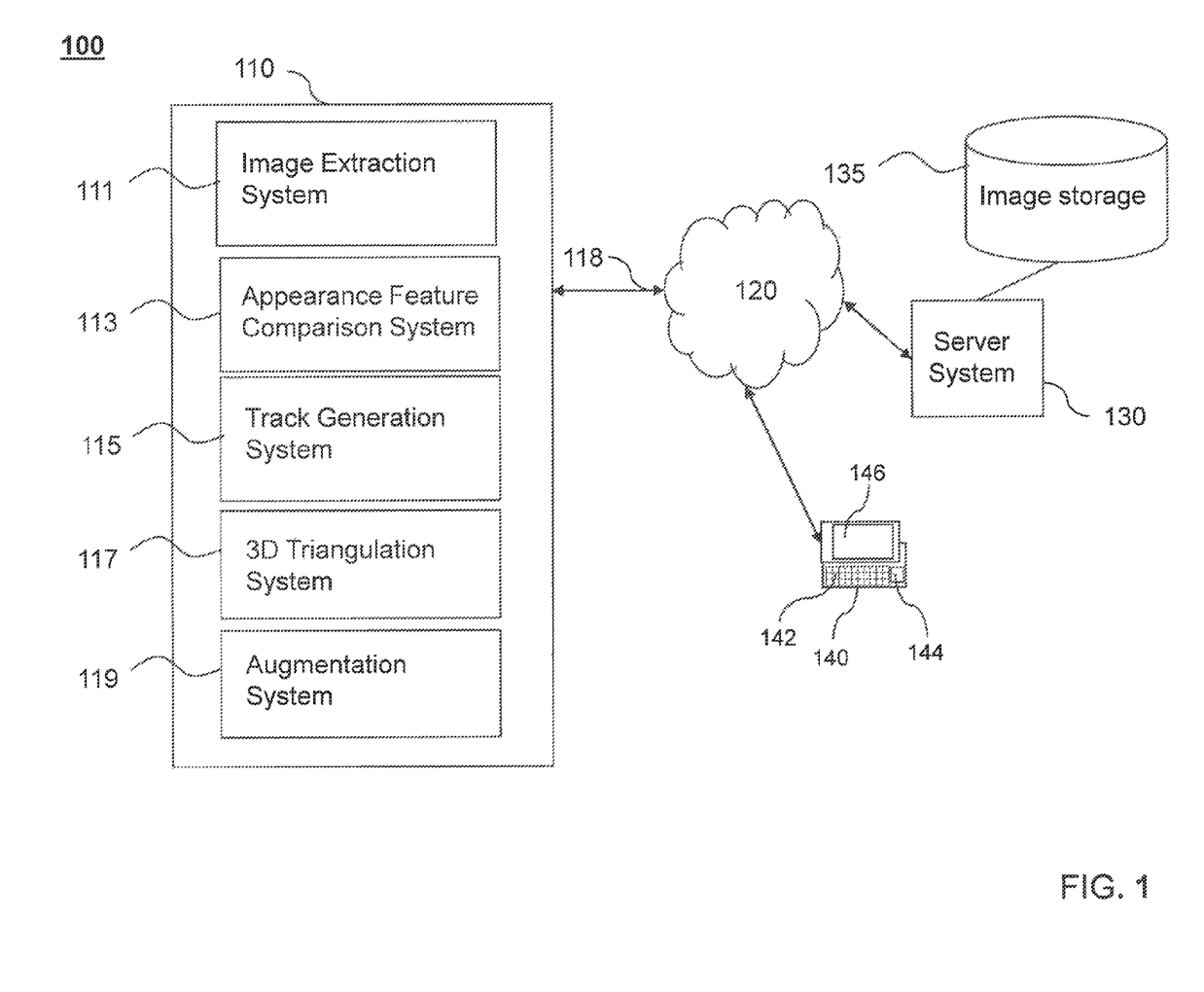
FIG. 1 is a diagram illustrating a system for analyzing appearance augmented 3-D point clouds for trajectory and camera localization, according to an embodiment.

FIG. 1 illustrates an augmented 3-D point cloud system 100 for matching images, including trajectories, according to an embodiment. Cloud system 100 comprises a cloud calculator 110, a network 120, image storage 135, image storage server system 130, and a user operated computing device 140. Cloud calculator 110 further comprises an image extraction system 111, an appearance feature comparison system 113, a track generation system 115, a 3-D triangulation system 117, and an augmentation system 119. The cloud calculator 110 is connected to the network via a path 118. The computing device 140 has a tactile input device 142, a display 146, and input pad sensor 144. In an embodiment, network(s) 120 may be any type of data network or combination of data networks including, but not limited to, a local area network (LAN), a medium area network, or a wide area network such as the Internet. Network 120, for example, may be a wired or wireless network that allows computing device 140, cloud calculator 110, and server system 130 to communicate with each other. Network 120 can further support world-wide-web (e.g. Internet) protocols and services.

Computing device 140 may be implemented on a computing device. Such a computing device can include, but is not limited to, a personal computer, mobile device such as a mobile phone, workstation, embedded system, game console, television, set-top box, or any other computing device that can support web browsing and image input. Such a computing device may include, but is not limited to, a device having a processor and memory for executing and storing instructions. Such a computing device may include software, firmware, and hardware. The computing device may also have multiple processors and multiple shared or separate memory components. In an exemplary embodiment, computing device 140 has multiple image systems or cameras 144. Software may include one or more applications, such as a mapping application and an operating system. Hardware can include, but is not limited to, a processor, memory, and graphical user interface display. An optional input device, such as a mouse or touch screen, may be used. Image analyzer 110 and system server 130 may provide content that can be retrieved by computing device 140 over network 120. Content retrieved by computing device 140 can be disseminated via display 146. In an embodiment, image analyzer 110 and system server 130 may be computing devices as described in FIG. 7 below.

Calculating an Augmented 3-D Point Cloud from a Posed Image Set

The procedure for calculating an augmented 3-D) point cloud from a posed image set is done with cloud calculator 110, according to an embodiment. Cloud calculator 110 consists of an image extraction system 111, an appearance feature comparison system 113, a track generation system 115, a 3-D triangulation system 117, and an augmentation system 119.

In an embodiment, cloud calculator 110 may obtain posed images, or sets of posed images for analysis. The images can be stored on an external source, such as image storage 135 being controlled by server system 130. In an embodiment, access to the posed images can be provided through network 120. In another embodiment, one or more posed images can be captured by computing device 140 and sent to cloud calculator 110 for analysis.

Image extraction system 113 performs an extraction of local image features from each image in a set of posed images. Image extraction system 113 can use any type of local image description, such as, but not limited to, a scale invariant feature transform (SIFT), a histogram of gradients (HoG), local binary patterns (LBPs), geometric blur, or any other local image descriptor.

Once the local image features are extracted, the extracted information is passed on to track generation system 115. Track generation system 115 matches local image features among nearby images and groups them into sets of tracks, which are also referred as 3-D points. If the posed image set form a trajectory, then features may be tracked along the trajectory for efficiency. If the posed image set does not form a trajectory, then features may be tracked between nearby images for efficiency. In both cases, extensive computation of comparing features between all pairs of images may be avoided.

3-D triangulation system 117 accepts as input the matched local image features that have been grouped into tracks by track generation system 115. For each track from the image poses and the track features image coordinates a 3-D point position may be calculated using triangulation. A track, or 3-D point, that is not consistent with a single 3-D point position may be discarded, or discounted. An image feature that does not belong to a track may be discarded because it does not generate a 3-D point, or it may be retained with its 3-D ray for geometric verification in an application.

Optionally, 3-D triangulation system can bundle adjust the posed image set using the 3-D point and the features image coordinates to refine both the image poses and the 3-D point locations. Tracks that are not consistent with a single 3-D point after bundle adjustment may be discarded or discounted.

Augmentation system 119 generates an augmented 3-D point set. The augmented 3-D point set is a set of 3-D points where each point is augmented with local image features. In addition, one may alternatively consider that each remaining local image feature is assigned to a shared 3-D point.

Solving for the 3-D Rigid Alignment Between Two Trajectories

Given that there are two posed image sets where each set forms a trajectory, it is possible to generate a global 3-D rigid transformation that relates the two trajectories, according to an embodiment. For example, one trajectory can be designated as the "reference" trajectory and the other as the "query" trajectory.

Solving for the 3-D rigid alignment starts by computing an augmented 3-D point set from each trajectory, as discussed above in "Calculating an Augmented 3-D Point Cloud from a Posed Image Set" The next step is to index all the local image features from the 3-D points in the reference trajectory into a fast index. There are various data structures one may use for the fast index, including but not limited to, an exact or approximate nearest neighbor tree, a vocabulary tree, or any other fast index data structure that provides an approximate or exact nearest neighbor lookup. Using the fast feature index for each local image feature in the query is augmented 3-D point cloud, it is possible to find the closest matching local image features from the reference trajectory. Each feature in the query set is thus matched to one or more features in the reference set.

Each feature match generates a candidate 3-D point match from the association between 3-D points and local image features in the augmented 3-D point cloud. Each 3-D point in the query set is thus matched to one or more 3-D points in the reference set. The confidence, or weight, of a particular candidate match may be calculated from both the geometric and appearance consistency of the matched 3-D points and their associated image features.

Optionally, the set of candidate 3-D point matches may be compressed using various heuristics to make subsequent steps, more efficient. In an embodiment, whether compressed or not, multiple matches per 3-D point may be stored to be more error tolerant in subsequent steps.

The next step consists of finding a consistent subset of candidate 3-D point matches that determine a 3-D rigid transformation between the two trajectories. Multiple consistent subsets may generate multiple hypotheses. Various methods may be used to determine the point matches including, but not limited to, random sample and consensus (RANSAC) algorithms, or by enumeration guided by geometric consistency. A resultant 3-D rigid transformation hypothesis may then be examined to determine which, if any, contain enough matches of good enough quality to declare that a successful match was found between the two trajectories.

Solving for the 3-D Rigid Alignment Between a Posed Image Set and an Image

The methodology to solve for a 3-D rigid alignment between a posed image set and an additional image is similar to the process described above involving two trajectories, according to an embodiment. For example, a 3-D rigid alignment of a query image can be found given a reference posed image set, a single query image, and knowledge of the camera intrinsics for the query image.

Solving for the 3-D rigid alignment starts by computing an augmented 3-D point set from the reference posed image set using the approach discussed above in "Calculating an Augmented 3-D Point Cloud from a Posed Image Set." The next step is to index all the local image features from the 3-D points in the reference point cloud into a fast index. As stated above, there are various data structures one may use for the fast index, including but not limited to, an exact or approximate nearest neighbor tree, a vocabulary tree, or any other fast index data structure that provides an approximate or exact nearest neighbor lookup. For each local image in the query image, the closest matching local image features in the reference images are found using the fast index of features from the reference image set.

Each feature match generates a candidate match between 3-D points in the reference set and image locations in the query image. Multiple 3-D points may match to the same location in the query image and a single 3-D point many match to multiple locations in the query image. The confidence, or weight, of a particular match may be calculated from both the geometric and appearance consistency of the match 3-D points and 2D image locations, and their associated image features. The candidate matches define candidate correspondences between 3-D points in the reference frame and 2D image locations in the query image.

Optionally, the set of candidate 3-D point matches may be compressed using various heuristics to make subsequent steps, more efficient. In an embodiment, whether compressed or not, multiple matches per 3-D point may be stored to be more error tolerant in subsequent steps.

The next step consists of finding a consistent subset of candidate 3-D point matches that determine a 3-D rigid transformation between the reference set and the query image. Multiple consistent subsets may generate multiple hypotheses. Various methods may be used to determine the point matches including, but not limited to, random sample and consensus (RANSAC) algorithms, or by enumeration guided by geometric consistency. A resultant 3-D rigid transformation hypothesis may then be examined to determine which, if any, contain enough matches of good enough quality to declare that a successful match was found between the query image and the reference image set.

Advantages of the Augmented 3-D Point Cloud Representation for 3D Alignment

Augmented 3-D point cloud representation for 3-D alignment is independent of camera intrinsics, vastly simplifying subsequent computations when used in conjunction with non-linear cameras, e.g., cameras with rolling shutters. Further, a full rigid transformation may be computed between either two posed image sets, e.g., two trajectories, or a posed image set and a query image. In contrast, typical image to image matching methods yield an epipolar constraint that results in a relatively weak relationship.

An additional advantage is that the number of features scales sub-linearly with the number of images, as features from multiple images are combined into tracks that represent 3-D world points. This compression of the features is a significant advantage over typical image based methods that cannot reduce the image features based on geometric consistency.

Augmented 3-D point cloud representation provides a representation that combines all reference fields of view such that matches naturally cover the entire field of view of a query image even if the matches come from different reference images that each only partially overlap the query image.

Compressing Appearance Augmented Point Clouds

Once an appearance augmented point cloud is generated, the amount of data in the cloud can be reduced, or compressed, thereby simplifying subsequent processing. Such compressing includes retention of only features that were matched successfully in two or more images.

In addition, compression is also accomplished by only maintaining a representative set of feature descriptors. For example, if a single 3-D point appears in multiple images, e.g., 30, but there are only a small number of distinctive ways the image appears, e.g., 2, then there is no need to store the 30 features, rather only two need to be stored. For example, a representative set of descriptors can be computed using the k-means algorithm.

Further compression is possible by eliminating 3-D points between images for which an appropriate number of 3-D points have already been retained.

Figure 2:
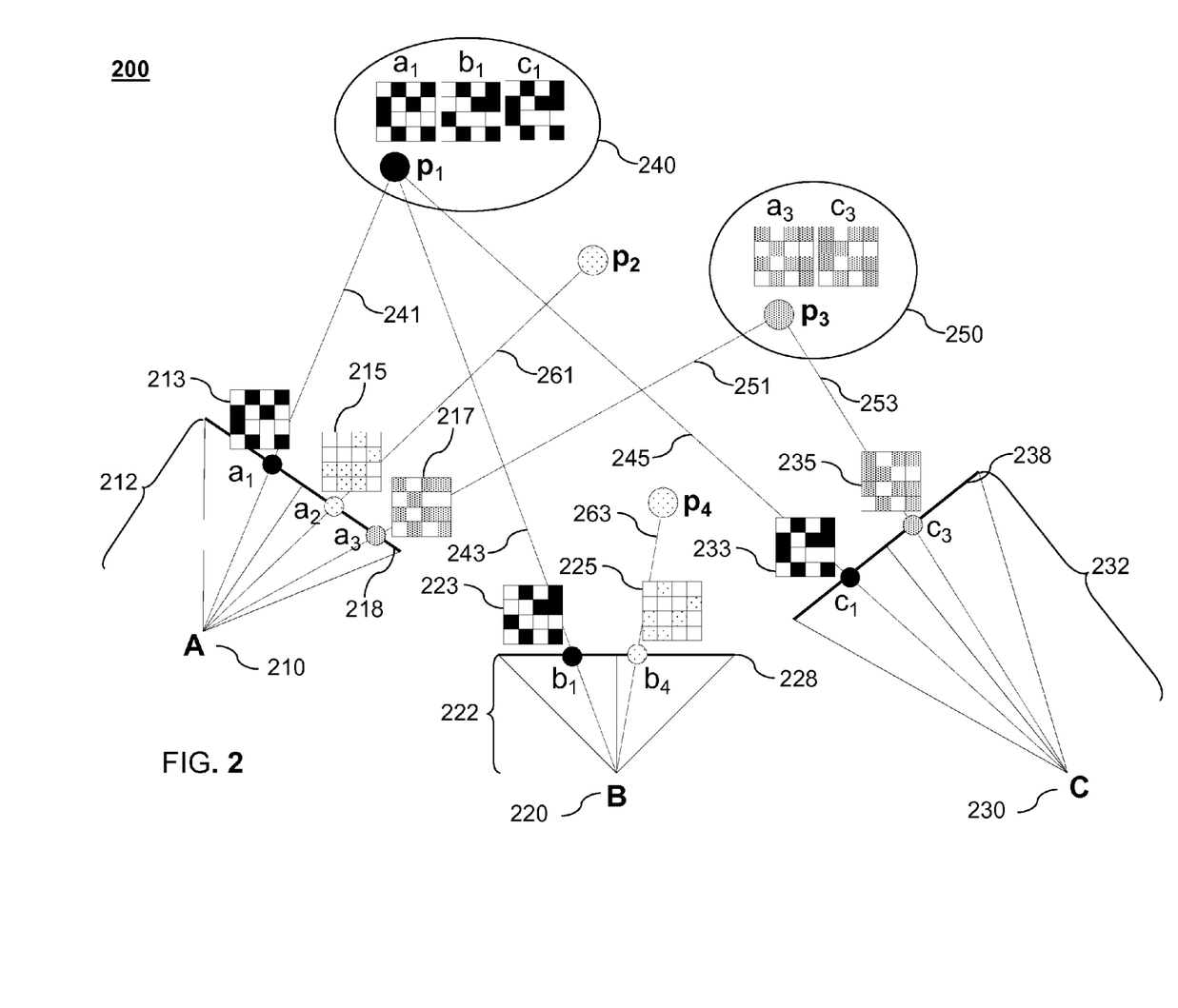
FIG. 2 is an example 200 of matching images using an augmented 3-D point cloud system, according to an embodiment.

FIG. 2 illustrates an example 200 of matching images using an augmented 3-D point cloud system, according to an embodiment. Example 200 illustrates three posed images represented as A 210, B 220, and C 230. A posed image is an image with a known position and orientation. In addition, the extrinsic information regarding the one or more image capture devices that have captured images A 210, B 220, and C 230 are also known. This extrinsic information includes the position and orientation of the image capture devices, but can also include intrinsic information such as focal length, lens, distortion, and image center. As an example, the focal length of image A 210 is shown as 212, the focal length of image B 220 is 222, and the focal length of image C 230 is 232.

In an embodiment, once images are captured, features from each image can be extracted. For example, features $a_1$, $a_2$, and $a_3$ are identified and extracted from image A 210. In a similar manner features $b_1$ and $b_4$ are identified and extracted from image B 220, and features $c_1$ and $c_3$ are identified and extracted from image C 230. The circles next to feature labels denote the feature positions while the grids denote the feature appearance.

Once the features have been extracted an attempt is made to match features between images based on appearance. In another embodiment an attempt is made to match features based on image proximity. In the example of FIG. 2, features $a_1$, $b_1$, and $c_1$ match each other based on their associated appearance features illustrated by 213, 223, and 233. Features $a_3$ and $c_3$ match based on their associated appearance features illustrated by 217 and 235, and features $a_2$ and $b_4$ match based on their associated appearance features illustrated by 215 and 225. Note that the concept of matching does not have to be an exact match. Features $a_1$, $b_1$, and $c_1$ are considered to match, but as shown in FIG. 2, the appearance feature grids 213, 215, and 217 are not exact. A match is defined as having appearance features that are the same within a threshold amount.

The next step in the process involves the triangulation and filtering of the identified matched features. Triangulation of features $a_1$, $b_1$, and $c_1$ is successful, all aligning at point $p_1$, along paths 241, 243, and 245. Triangulation of features $a_3$ and $c_3$ is successful, both aligning at point $p_3$, along paths 251 and 253. However, in this example features $a_2$ and $b_4$ do not triangulate, with feature $a_2$ pointing to point $p_2$, along path 261, and feature $b_4$ pointing to point $p_4$, along path 263. Initially, features $a_2$ and $b_4$ were identified to be a match based on feature appearance similarity. However, in the triangulation process it was determined that features $a_2$ and $b_4$ were not appropriate matches due to a failure of triangulation. As previously discussed, features $a_2$ and $b_4$ could be eliminated to compress the overall size of the stored data, or could be retained for some possible future use. Clouds 240 and 250, associated with point $p_a$ and point $p_3$, respectively, are augmented with the image features that gave rise to the matches.

In an embodiment, the identified 3-D point locations and image capture device locations can be jointly optimized to improve triangulation quality, eliminating 3-D points that do not triangulate sufficiently, e.g., not above a set threshold. As an end result, FIG. 2 illustrates the output of an augmented 3-D point cloud system being clouds 240 and 250, containing 3-D points augmented with appearance information. For each feature that is attached to a 3-D point, it may not be necessary to store the information regarding the image from which the point was produced, and where in that image it came from, as that information may not be needed for a specific application program using this information.

Figure 3:
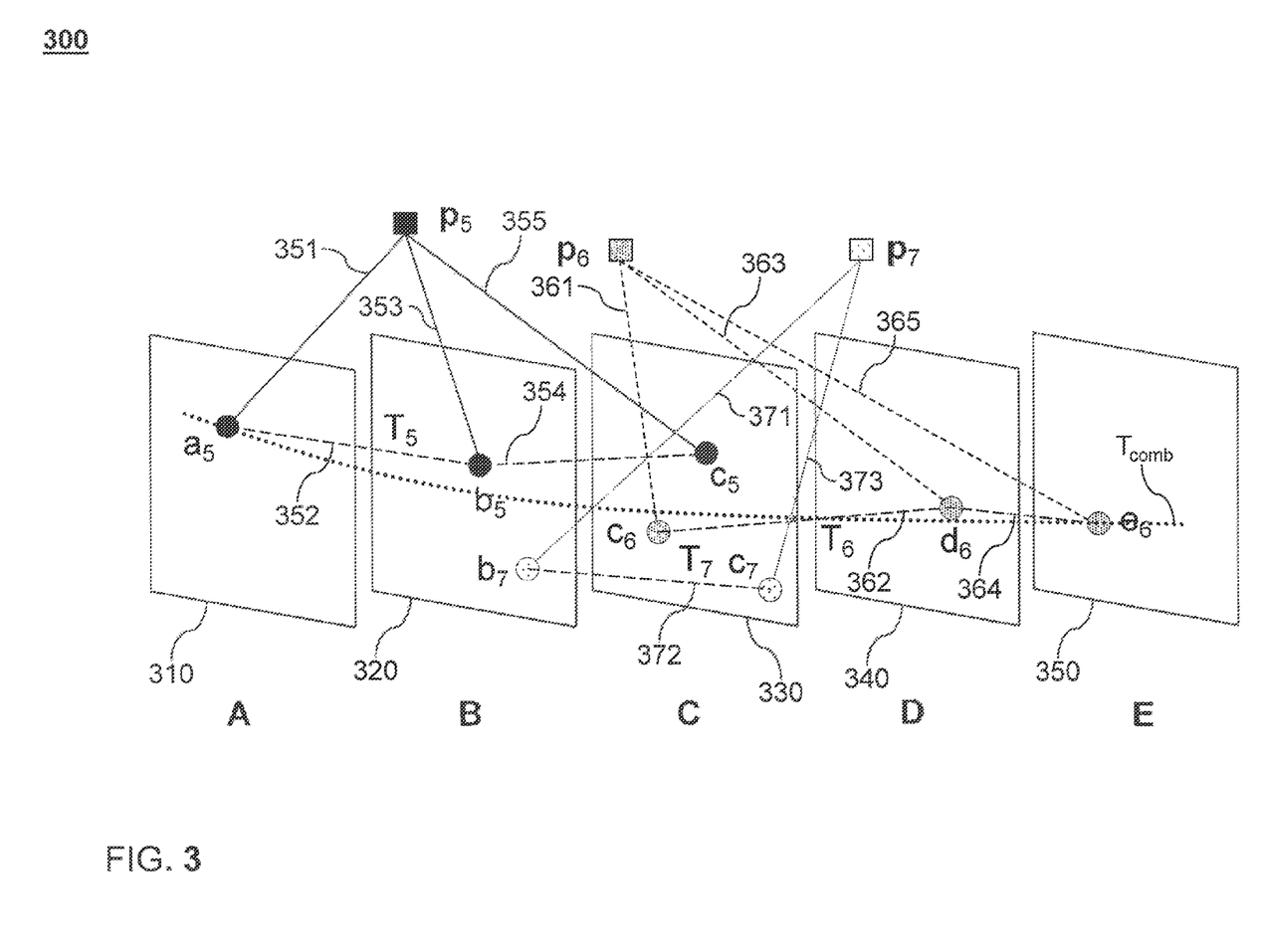
FIG. 3 is a an example 300 of an augmented 3-D point cloud system for producing and matching trajectories using an appearance augmented 3-D point cloud system, according to an embodiment.

FIG. 3 illustrates an example 300 of an augmented 3-D point cloud system for producing and matching trajectories using an appearance augmented 3-D point cloud system, according to an embodiment. Example 300 illustrates five posed images represented as A, B, C, D, and E. However, in an embodiment, images A, B, C, D, and E are captured by one or more moving entities where each moving entity captures a sequence of images at different points in time, e.g., a travelling platform, rather than stationary image capture devices. In the first captured image, A, there is only a single identified feature, $a_5$. In the second captured image, B, there are two extracted features, $b_5$, and $b_7$, which are associated, as will be shown, with the same 3-D point. Using the process previously explained, and as shown in the example in FIG. 2, points $a_5$ and $b_5$ are matched and triangulated. In this example points $a_5$ and $b_5$ match based on feature appearance and also correctly triangulate to point $p_5$ along paths 351 and 353 respectively. In addition, the matching and triangulation process also produces a first path of a trajectory, path 352, which is shown as the first part of trajectory $T_5$.

In the third captured image, C, there are three extracted features, $c_5$, $c_6$ and $c_7$. Point $c_5$ is successfully matched and triangulated, along path 355, with points $a_5$ and $b_5$. This matching also produces a second portion of trajectory $T_5$, path 354. Point $c_6$ does not match anything yet and therefore is simply stored until additional information is obtained. Point $c_7$ produces a successful match and triangulates, along path 373, with point $b_7$, along path 371, which also produces a path 372 that is identified as trajectory $T_7$. A trajectory length can be formed from a single segment, as shown by trajectory $T_7$, or by numerous segments, as shown by $T_5$, with no limitation placed on the number of segments.

In the fourth captured image D, and the fifth captured image E, there are two additional extracted features, $d_6$ and $e_6$. Points $d_6$ and $e_6$ successfully match and triangulate with point $c_6$, along paths 361, 363, and 365 to produce trajectory $T_6$, consisting of paths 362 and 364.

The resulting trajectories in FIG. 3 are therefore $T_5$, $T_6$, and $T_7$ that can be combined, for example using the approaches previously described, to produce a single overall trajectory, illustrated, for example, as trajectory $T_{comb}$.

Methods

Figure 4:
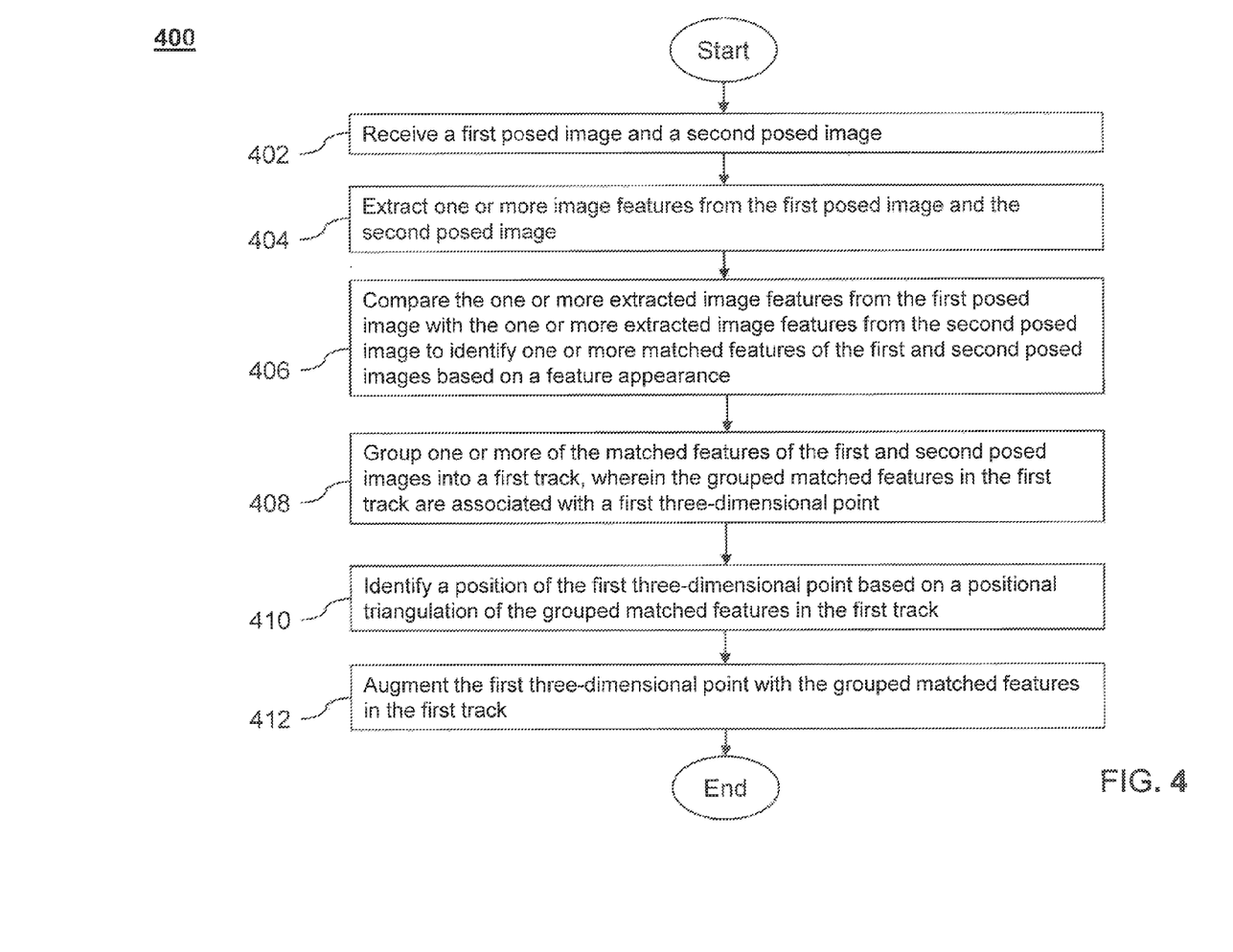
FIG. 4 is a flowchart of a method for analyzing appearance augmented 3-D point clouds for trajectory and camera localization, according to an embodiment.

FIG. 4 describes an exemplary embodiment of a method 400 for matching images, or vehicle trajectories, using appearance augmented 3-D point clouds. Method 400 begins at step 402 where the system receives a first posed image and second posed image. For example, FIG. 2 illustrates receiving three posed images, represented as A 210, B 220, and C 230. Each posed image may be captured from, for example, an input pad 144 on a mobile computing device 146 and communicated over a network 120 of FIG. 1. Alternatively, the posed images may be stored in image storage 135 and queried from server system 130.

Method 400 continues to step 404 where one or more image features are extracted from the first posed image and the second posed image. In an exemplary embodiment, this extraction takes place in image extraction system 111. In an exemplary embodiment, any local image descriptor may be used for this purpose. Appropriate descriptors include, but are not limited to, SIFT, histogram of gradients (HoG), local binary patterns (LBPs), geometric blur, or any other local image descriptor. For example, FIG. 2 illustrates where features $a_1$, $a_2$, and $a_3$ are identified and extracted from image A 210, features $b_1$ and $b_4$ are identified and extracted from image B 220, and features $c_1$ and $c_3$ are identified and extracted from image C 230

Method 400 continues with step 406, where the one or more extracted image features from the first posed image are compared with the one or more extracted image features of the second posed image to identify one or more matched features of the first and second posed images based on a feature appearance. In an exemplary embodiment, the appearance feature comparison system 113 handles this step. For example, as shown in FIG. 2, an attempt is made to match features between images based on appearance, and in another embodiment, also on image proximity, where features $a_1$, $b_1$, and $c_1$ watch each other, based on their associated appearance features illustrated by 213, 223, and 233. In addition, features $a_3$ and $c_3$ match, based on their associated appearance features illustrated by 217 and 235, and features $a_2$ and $b_4$ match, based on their associated appearance features illustrated by 215 and 225.

Method 400 continues to step 408, where the one or more matched features of the first and second posed images are grouped into a first track, wherein the grouped matched features in the first track are associated with a first three-dimensional (3-D) point. In an embodiment, the one or more matched features of the first and second posed images are matched among nearby images and grouped into a track. If the one or more matched features of the first and second posed images form a trajectory, then features may be tracked along the trajectory for efficiency. If the one or more matched features of the first and second posed images set do not form a trajectory, then features may be "tracked" between nearby images for efficiency. In an exemplary embodiment, the track generation system 115 handles this step.

Method 400 continues with step 410, where a position of the first 3-D point based on a positional triangulation of the grouped matched features of the first track is identified. For each track, the image poses and the grouped matched features in the track, triangulate a 3-D point. A track that is not consistent with a single 3-D point may be discarded or discounted. An image features that does not belong to a track may be discarded because it does not generate a 3-D point, or it may be retained with its 3-D ray for geometric verification in an application. In an exemplary embodiment, the 3-D triangulation system 117 processes this step.

In a further embodiment, the method 400, may bundle adjust the posed image set using the 3-D points and the features' image coordinates to refine both the image poses and the 3-D point locations. Tracks that are not consistent with a single 3-D point after bundle adjustment may be discarded or discounted. In another embodiment, the method may assign each remaining local image feature to a (shared) 3-D point.

Method 400 continues to step 412 where the first 3-D point is augmented with the grouped matched features in the first tract. The augmented 3-D point is independent of camera intrinsics, which simplifies subsequent computations when non-linear cameras are involved. In an exemplary embodiment, the augmentation system 119 processes this step. The augmented 3-D point cloud may be transmitted from cloud calculator 110 via network 120 to server system 130 to for storage of the augmented 3-D point cloud in image storage 135 for future reference.

Figure 5:
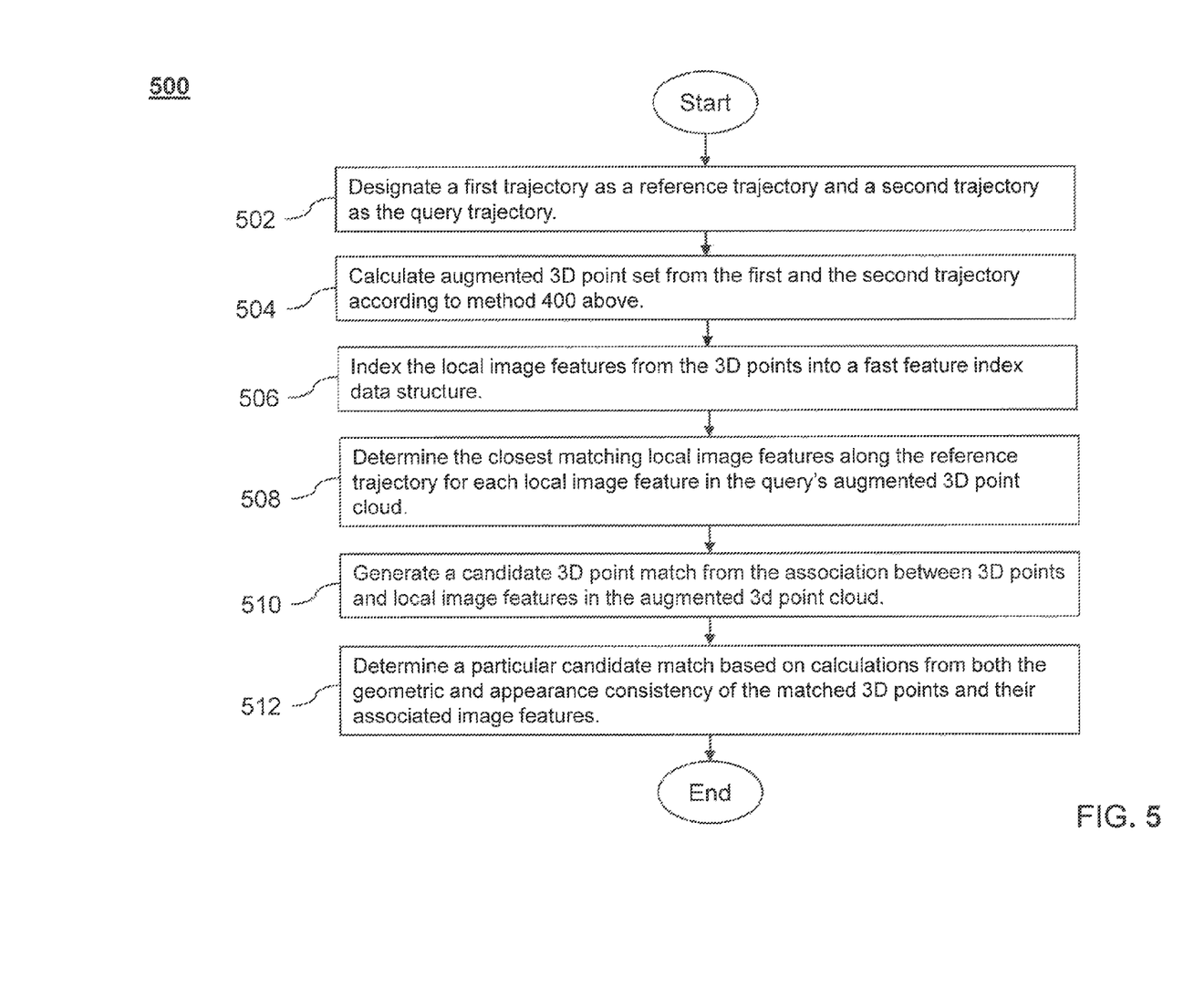
FIG. 5 is a flowchart of a method for solving the 3-D rigid alignment between two trajectories, according to an embodiment.

FIG. 5 recites a method 500 for finding the global 3-D rigid transformation that relates the two trajectories between two posed images sets, according to an embodiment. Method 500 starts with step 502, where one trajectory is designated as a reference trajectory and the other as a query trajectory. In step 504, an augmented 3-D point set from each trajectory is calculated according to method 400 disclosed above.

Method 500 continues with step 506, where all local images features from the 3-D points in the reference trajectory are indexed into a fast feature index. There are various data structures that may be used for the fast index, including but not limited to an exact or approximate nearest neighbor tree, a vocabulary tree, or any other fast index data structure that provides approximate nearest neighbor look up. In step 508, the fast feature index is used to find, for each local image feature in the query's augmented 3-D point cloud, the closest matching local image features along the reference trajectory. Each feature in the query set is matched to one or more features in the reference set. In step 510, each feature match from step 508 is used to generate a candidate 3-D point match from the association between 3-D points and local image features in the augmented 3-D point cloud. Each 3-D point in the query set is thus matched to one or more 3-D points in the reference set.

Method 500 concludes with step 512, where the confidence or weight of a particular candidate match may be calculated from both geometric and appearance consistency of the matched 3-D points and their associated image features. The set of candidate 3-D point matches may be optionally compressed using various heuristics to make subsequent steps more efficient. Multiple matches per 3-D point may be retained to be more error tolerant in subsequent steps. In addition, a consistent subset of candidate 3-D point matches that resolve a 3-D rigid transformation between the two trajectories may be determined. Multiple consistent subsets may generate multiple hypotheses. There are various methods available to compute this step, including but not limited to random sample and consensus (RANSAC) algorithm or enumeration guided by geometric consistency. The resultant 3-D rigid transformation hypotheses may then be examined to determine which, if any, contain enough matches, e.g., above a set threshold, of sufficient quality to declare that a successful match was found between the two trajectories.

Figure 6:
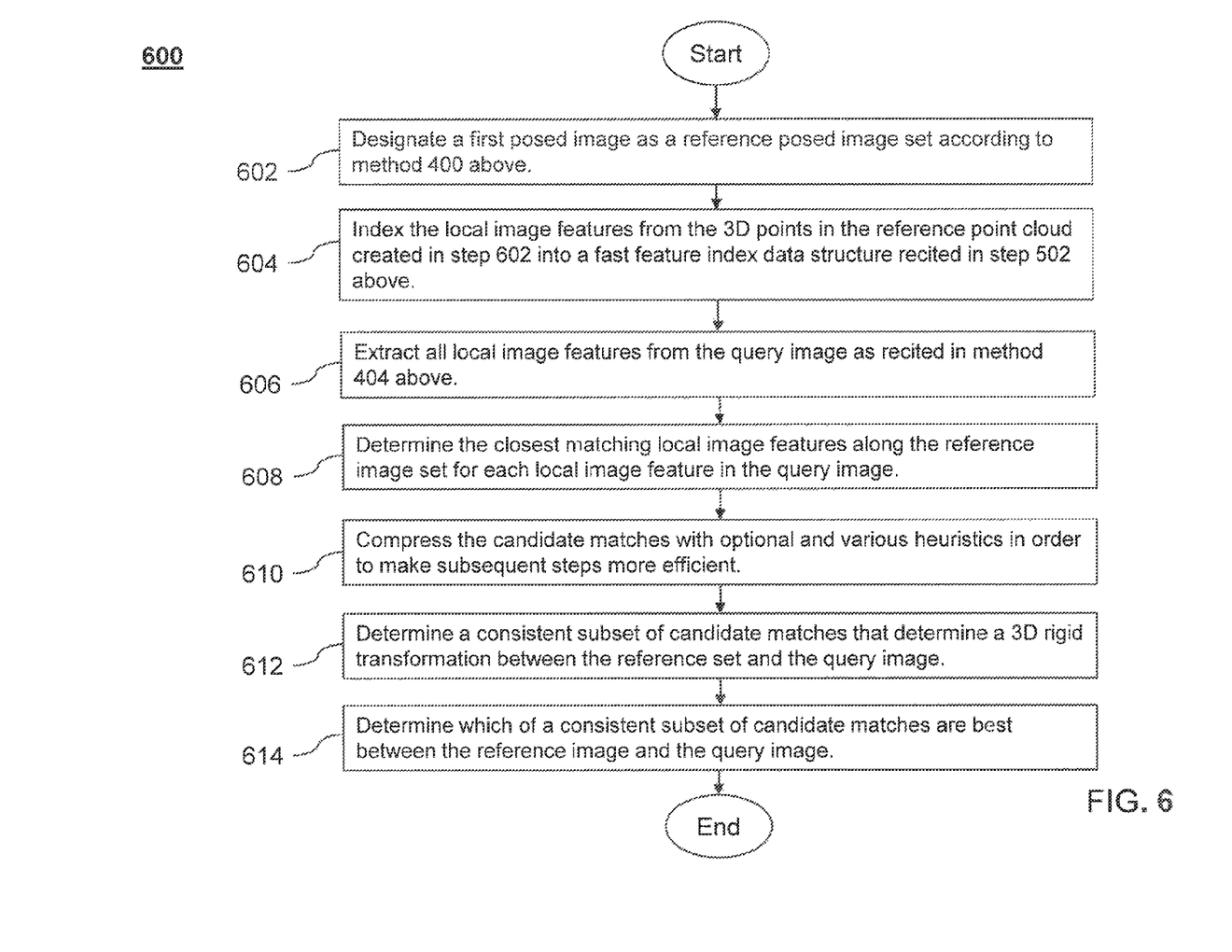
FIG. 6 is a flowchart of a method for solving for the 3-D rigid alignment between a posed image set and an image, according to an embodiment.

FIG. 6 recites a method 600 for resolving the 3-D rigid, alignment between a posed image set and an image, according to an embodiment. Method 600 starts with step 602, where a first posed image set may be treated as a reference posed image set by computing an augmented 3-D point set using the method 400 recited above. In step 604, all the local image features from the 3-D points in the reference point cloud are indexed into a fast index, as described in step 502 above. Next, in step 606, local image features are extracted from the query image, as recited in step 404 above, such that each feature in the query image is associated with its position in the query image.

Method 600 continues to step 608, where the fast index of features from the reference image set, for each local image in the query image, is used to find the closest matching local image features in the reference images. Each local image feature in the query image may match multiple image features in the reference set. Each feature match from step 608 generates a candidate match between 3-D points in the reference set and image locations in the query image. Note that multiple 3-D points may match to the same location in the query image, and a single 3-D point may match to multiple locations in the query image. The confidence, or weight, of a particular match may be calculated from both the geometric and appearance consistency of the matched 3-D points and 2D image locations, and their associated image features. The candidate matches define candidate correspondences between 3-D points in the reference frame and 2D image locations in the query image.

Method 600 continues to step 610 where the set of candidate matches may be optionally compressed using various heuristics to make subsequent steps more efficient. Whether or not the candidate matches are compressed, multiple matches per 3-D point and per query image location may be kept to increase error tolerance in subsequent processing. In step 612 a consistent subset of candidate matches that determine a 3-D rigid transformation between the reference set and the query image is generated. Multiple consistent subsets may generate multiple hypotheses. There are various methods that can be uses for this step, for example, including but not limited to, the random sample and consensus (RANSAC) algorithm, or enumeration guided by geometric consistency. Finally, in step 614, the resultant 3-D rigid transformation hypotheses may be examined to determine which, if any, contain enough matches, e.g., above a set threshold, of sufficient quality to declare that a successful match was found between the query image and the reference image set.

Example Computer System Implementation

Aspects of the present invention shown in FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

Figure 7:
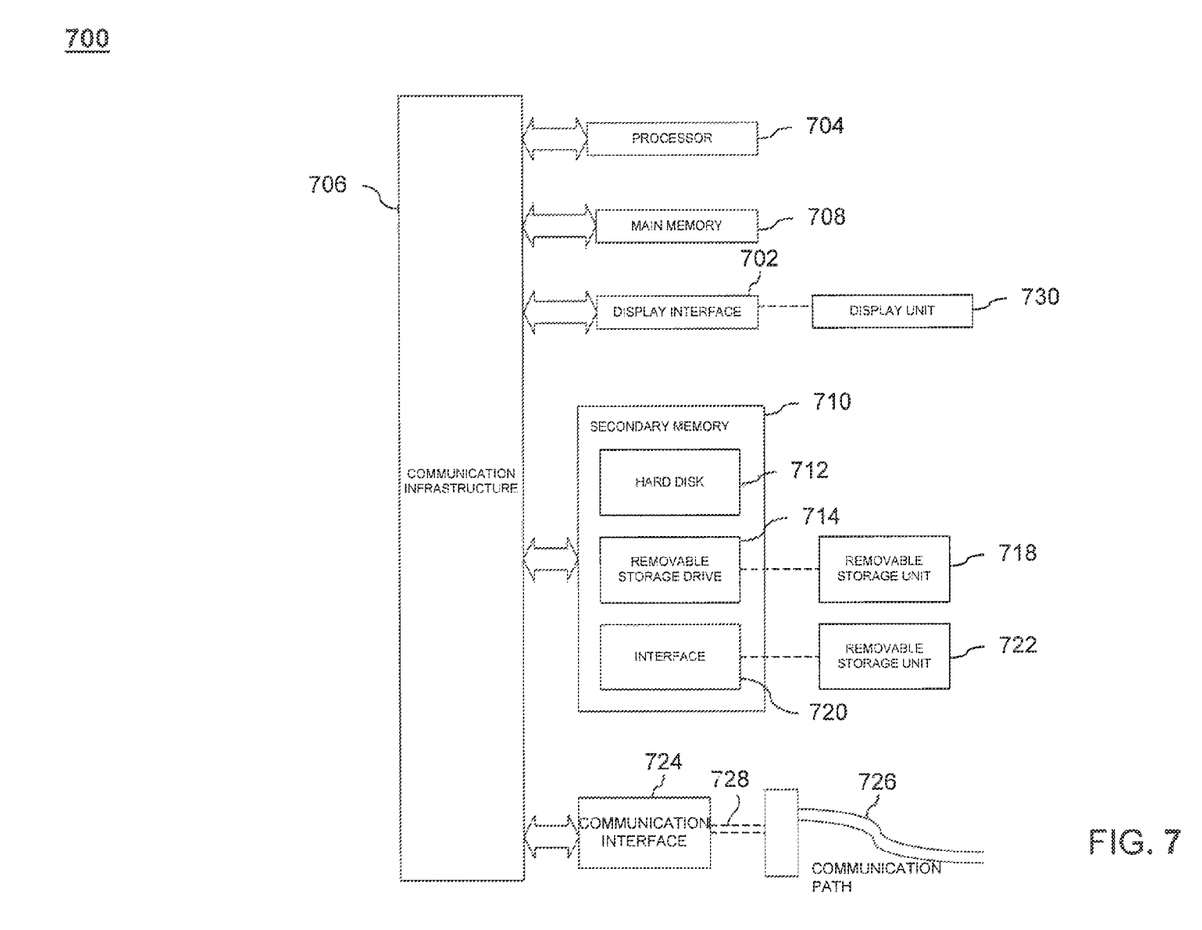
FIG. 7 is a diagram illustrating an exemplary computing system in which embodiments can be implemented.

FIG. 7 illustrates an example computer system 700 in which embodiments, or portions thereof, may by implemented as computer-readable code. For example, portions of cloud calculator 110, image storage server system 130, and user operated computing device 140, may be implemented in portions of computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multicore/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, removable storage drive 714. Removable storage drive 714 may include a floppy disk drive, a magnetic tape drive, an optical disk drive, a flash memory, or the like. The removable storage drive 714 reads from and/or writes to a removable storage unit 718 in a well known manner. Removable storage unit 718 may include a floppy disk, magnetic tape, optical disk, etc. which is read by and written to by removable storage drive 714. As will be appreciated by persons skilled in the relevant art, removable storage unit 718 includes a computer usable storage medium having stored therein computer software and/or data.

Computer system 700 (optionally) includes a display interface 702 (which can include input and output devices such as keyboards, mice, etc.) that forwards graphics, text, and other data from communication infrastructure 706 (or from a frame buffer not shown) for display on display unit 730.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communication interface 724. Communication interface 724 allows software and data to be transferred between computer system 700 and external devices. Communication interface 724 may include a modem, a network interface (such as an Ethernet card), a communication port, a PCMCIA slot and card, or the like. Software and data transferred via communication interface 724 may be in the form of signals, which may be electronic, electromagnetic, optical, or other signals capable of being received by communication interface 724. These signals may be provided to communication interface 724 via a communication path 726. Communication path 726 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communication interface 724. Such computer programs, when executed, enable computer system 700 to implement the present invention as discussed herein. In particular, the computer programs, when executed, enable processor device 704 to implement the processes of the present invention, such as the stages in the method illustrated by flowchart 300 of FIG. 3, as previously discussed. Accordingly, such computer programs represent controllers of the computer system 700. Where the invention is implemented using software, the software may be stored in a computer program product and loaded into computer system 700 using removable storage drive 714, interface 720, and hard disk drive 712, or communication interface 724.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A computer-implemented image matching method, comprising:
   receiving a first posed image and a second posed image;
   extracting one or more image features from the first posed image and the second posed image;
   comparing the one or more extracted image features from the first posed image with the one or more extracted image features from the second posed image to identify one or more matched features of the first and second posed images based on a feature appearance;
   grouping one or more of the matched features of the first and second posed images, wherein the grouped matched features of the first and second posed images are associated with a first three-dimensional point;
   identifying a position of the first three-dimensional point based on a positional triangulation of the grouped matched features associated with the first three-dimensional point; and
   augmenting the first three-dimensional point with the grouped matched features associated with the first three-dimensional point.

2. The method of claim 1, further comprising:
   grouping one or more of the matched features of the first and second posed images, wherein the grouped matched features of the first and second posed images are associated with a second three-dimensional point;
   identifying a position of the second three-dimensional point based on a positional triangulation of the grouped matched features associated with the second three-dimensional point; and
   augmenting the second three-dimensional point position with the grouped matched features associated with the second three-dimensional point,
   wherein the augmented first three-dimensional point and the augmented second three-dimensional point comprise an augmented three-dimensional point set.

3. The method of claim 1, wherein the feature appearance comprises sift-like features or visual vocabulary tree features.

4. The method of claim 1, further comprising limiting the matched features to a geometrically consistent subset.

5. The method of claim 1, further comprising compressing the augmented first three-dimensional point, comprising:
   removing an extracted image feature if the extracted image feature contains less than a threshold quantity of identified matching features.

6. The method of claim 1, further comprising compressing the first augmented three-dimensional point, comprising:

defining a representative set of feature appearances based on the grouped matched features in the first track; and removing extracted image features that are not part of the representative set of feature appearances.

7. The method of claim 2, further comprising compressing the augmented three-dimensional point set, comprising:

removing one or more three-dimensional points based on a threshold.

8. The method of claim 1, wherein the first or second posed images comprise known intrinsic and extrinsic camera information.

9. The method of claim 1, wherein the identifying of the position of the first three-dimensional point comprises the use of bundle adjustment.

10. The method of claim 2, further comprising:

receiving a third posed image and a fourth posed image;

extracting one or more image features from the third posed image and the fourth posed image;

comparing the one or more extracted image features from the third posed image with the one or more extracted image features from the fourth posed image to identify one or more matched features of the third and fourth posed images based on a feature appearance;

grouping one or more of the matched features of the third and fourth posed images, wherein the grouped matched features of the third and fourth posed images are associated with a third three-dimensional point;

identifying a position of the third three-dimensional point based on a positional triangulation of the grouped matched features associated with the third three-dimensional point;

augmenting the third three-dimensional point with the grouped matched features associated with the third three-dimensional point;

grouping one or more of the matched features of the third and fourth posed images, wherein the grouped matched features of the third and fourth posed images are associated with a fourth three-dimensional point;

identifying a position of the fourth three-dimensional point based on a positional triangulation of the grouped matched features associated with the fourth three-dimensional point;

augmenting the fourth three-dimensional point position with the grouped matched features associated with the fourth three-dimensional point, wherein a second augmented three-dimensional point set is comprised of the augmented third three-dimensional point and the augmented fourth three-dimensional point;

identifying a set of matches between the first augmented three-dimensional point set and the second augmented three-dimensional point set based on feature appearance;

computing a three-dimensional rigid alignment that is geometrically consistent with a largest set of matches between the first augmented three-dimensional point set and the second augmented three-dimensional point set based on feature appearance.

11. The method of claim 10, further comprising computing the three-dimensional rigid alignment using a random sample consensus algorithm.

12. The method of claim 11, further comprising:

refining the three-dimensional rigid alignment by bundle adjustment.

13. The method of claim 1, further comprising:

receiving a query image, wherein the query image is associated with intrinsic information of an image capture device used in the generation of the query image;

extracting one or more query image features from the query image;

associating each of the one or more query image features with a corresponding position in the query image;

comparing each of the one or more query image features to the one or more augmented first three-dimensional point features; and identifying a consistent subset of the augmented first three-dimensional point features to determine a three-dimensional rigid transformation between the query image and the augmented first three-dimensional point.

14. A system for three-dimensional image matching point cloud generation comprising:

a computer-based image extraction system configured to extract one or more image features from a first posed image and a second posed image;

an appearance feature comparison system configured to compare the one or more extracted image features from the first posed image with the one or more extracted image features from the second posed image to identify one or more matched features of the first and second posed images based on a feature appearance;

a track generation system configured to group one or more of the matched features of the first and second posed images into a first track, wherein the grouped matched features in the first track are associated with a first three-dimensional point;

a three-dimensional triangulation system configured to identify a position of the first three-dimensional point based on a positional triangulation of the grouped matched features in the first track; and an augmentation system configured to augment the first three-dimensional point with the grouped matched features in the first track.

15. The system of claim 14, wherein:

the track generation system is configured to group one or more of the matched features of the first and second posed images into a second track, wherein the grouped matched features in the second track are associated with a second three-dimensional point;

the three-dimensional triangulation system is configured to identify a position of the second three-dimensional point based on a positional triangulation of the grouped matched features in the second track; and the augmentation system is configured to augment the second three-dimensional point position with the grouped matched features in the second track, wherein a first augmented three-dimensional point set is comprised of the augmented first three-dimensional point and the augmented second three-dimensional point.

16. The system of claim 14, wherein the feature appearance comprises sift-like features or visual vocabulary tree features.

17. The system of claim 14, further comprising a filtering system configured to limit the matched features to a geometrically consistent subset.

18. The system of claim 14, further comprising a filtering system configured to compress the augmented first three-dimensional point based on removing an extracted image feature if the extracted image feature contains less than a threshold quantity of identified matching features.

19. The system of claim 14, further comprising a filtering system configured to compress the first augmented three-dimensional point based on defining a representative set of feature appearances based on the grouped matched features in the first track and removing extracted image features that are not part of the representative set of feature appearances.

20. The system of claim 15, further comprising a filtering system configured to compress the first augmented three-dimensional point set by removing one or more tracks based on a threshold.

21. The system of claim 15, wherein:
the computer-based image extraction system is configured to extract one or more image features from a third posed image and a fourth posed image;
the appearance feature comparison system is configured to compare the one or more extracted image features from the third posed image with the one or more extracted image features from the fourth posed image to identify one or more matched features of the third and fourth posed images based on a feature appearance;
the track generation system is configured to group one or more of the matched features of the third and fourth posed images into a third track, wherein the grouped matched features in the third track are associated with a third three-dimensional point;
the three-dimensional triangulation system is configured to identify a position of the third three-dimensional point based on a positional triangulation of the grouped matched features in the third track;
the augmentation system is configured to augment the third three-dimensional point with the grouped matched features in the third track;
the track generation system is further configured to group one or more of the matched features of the third and fourth posed images into a fourth track, wherein the grouped matched features in the fourth track are associated with a fourth three-dimensional point; and
the augmentation system is further configured to augment the fourth three-dimensional point position with the grouped matched features in the fourth track, wherein a second augmented three-dimensional point set is comprised of the augmented third three-dimensional point and the augmented fourth three-dimensional point;
a matching system is configured to identify a set of matches between the first augmented three-dimensional point set and the second augmented three-dimensional point set based on feature appearance;
a rigid alignment system configured to compute a three-dimensional rigid alignment that is geometrically consistent with a largest set of matches between the first augmented three-dimensional point set and the second augmented three-dimensional point set based on feature appearance.

22. The system of claim 14, further comprising:
the computer-based image extraction system configured to extract one or more query image features from a query image, wherein the query image is associated with intrinsic information of an image capture device used in the generation of the query image; and
a query system configured to:
associate each of the one or more query image features with a corresponding position in the query image;
compare each of the one or more query image features to the one or more augmented first three-dimensional point features; and
identify a consistent subset of the augmented first three-dimensional point features to determine a three-dimensional rigid transformation between the query image and the augmented first three-dimensional point.

23. A computer program product, comprising a non-transitory computer readable storage medium, the non-transitory computer readable storage medium having embodied thereon computer readable program code to realize three-dimensional point cloud generation, the computer control logic comprising:
first computer readable program code for causing the computer to receive a first posed image and a second posed image;
second computer readable program code for causing the computer to extract one or more image features from the first posed image and the second posed image;
third computer readable program code for causing the computer to compare the one or more extracted image features from the first posed image with the one or more extracted image features from the second posed image to identify one or more matched features of the first and second posed images based on a feature appearance;
fourth computer readable program code for causing the computer to group one or more of the matched features of the first and second posed images, wherein the grouped matched features of the first and second posed images are associated with a first three-dimensional point fifth computer readable program code for causing the computer to identify a position of the first three-dimensional point based on a position triangulation of the grouped matched features associated with the first three-dimensional point; and
sixth computer readable program code for causing the computer to augment the first three-dimensional point with the grouped matched features associated with the first three-dimensional point.

24. The computer program product of claim 23, further comprising:
seventh computer readable program code for causing the computer to group one or more of the matched features of the first and second posed images, wherein the grouped matched features of the first and second posed images are associated with a second three-dimensional point;
eight computer readable program code for causing the computer to identify a position of the second three-dimensional point based on a positional triangulation of the grouped matched features associated with the second three-dimensional point; and
ninth computer readable program code for causing the computer to augment the second three-dimensional point position with the grouped matched features associated with the second three-dimensional point, wherein the augmented first three-dimensional point and the augmented second three-dimensional point comprise an augmented three-dimensional point set.

25. The computer program product of claim 24, further comprising:
tenth computer readable program code for causing the computer to receive a third posed image and a fourth posed image;
eleventh computer readable program code for causing the computer to extract one or more image features from the third posed image and the fourth posed image;
twelfth computer readable program code for causing the computer to compare the one or more extracted image features from the third posed image with the one or more extracted image features from the fourth posed image to identify one or more matched features of the third and fourth posed images based on a feature appearance;
thirteenth computer readable program code for causing the computer to group one or more of the matched features of the third and fourth posed images, wherein the grouped matched features of the third and fourth posed images are associated with a third three-dimensional point;

fourteenth computer readable program code for causing the computer to identify a position of the third three-dimensional point based on a positional triangulation of the grouped matched features associated with the third three-dimensional point;

fifteenth computer readable program code for causing the computer to augment the third three-dimensional point with the grouped matched features associated with the third three-dimensional point;

sixteenth computer readable program code for causing the computer to group one or more of the matched features of the third and fourth posed images, wherein the grouped matched features of the third and fourth posed images are associated with a fourth three-dimensional point; and seventeenth computer readable program code for causing the computer to identify a position of the fourth three-dimensional point based on a positional triangulation of the grouped matched features associated with the fourth three-dimensional point;

eighteenth computer readable program code for causing the computer to augment the fourth three-dimensional point position with the grouped matched features associated with the fourth three-dimensional point, wherein a second augmented three-dimensional point set is comprised of the augmented third three-dimensional point and the augmented fourth three-dimensional point;

nineteenth computer readable program code for causing the computer to identify a set of matches between the first augmented three-dimensional point set and the second augmented three-dimensional point set based on feature appearance;

twentieth computer readable program code for causing the computer to compute a three-dimensional rigid alignment that is geometrically consistent with a largest set of matches between the first augmented three-dimensional point set and the second augmented three-dimensional point set based on feature appearance.

26. A computer-implemented image matching method, comprising:

receiving a first image collection and a second image collection;

determining a first trajectory based on the first image collection and a second trajectory based on the second image collection;

querying the second image collection against the first image collection to determine a set of closely matched images between the first and second image collections;

determining an epipolar constraint for an intersection based on the set of closely matched images; and generating a three-dimensional alignment transform that relates the first trajectory to the second trajectory at the intersection.

* * * * *

UNITED STATES PATENT AND TRADEMARK OFFICE
CERTIFICATE OF CORRECTION

PATENT NO. : 8,442,307 B1  
APPLICATION NO. : 13/100699  
DATED : May 14, 2013  
INVENTOR(S) : Anati et al.

Page 1 of 1

It is certified that error appears in the above-identified patent and that said Letters Patent is hereby corrected as shown below:

In the Claims

<u>Column 18</u>
Line 22, please replace "point fifth computer readable program code" with --point; fifth computer readable program code--.

<u>Column 18</u>
Line 22, please insert a line break between the words "point;" and "fifth computer readable program code".

<u>Column 18</u>
Line 24, please replace "position triangulation" with --positional triangulation--.

<u>Column 18</u>
Line 39, please replace "eight computer readable program code" with --eighth computer readable program code--.

Signed and Sealed this
Nineteenth Day of November, 2013

Teresa Stanek Rea
*Deputy Director of the United States Patent and Trademark Office*